United States Patent [19]

Osakabe

[11] 3,992,582

[45] Nov. 16, 1976

[54] REVERBERATION SOUND PRODUCING APPARATUS

[75] Inventor: Yoshio Osakabe, Yokohama, Japan

[73] Assignee: Sony Corporation, Tokyo, Japan

[22] Filed: Aug. 2, 1974

[21] Appl. No.: 494,370

[30] Foreign Application Priority Data

Aug. 13, 1973 Japan ............................... 48-90694

[52] U.S. Cl. ................................................ 179/1 J

[51] Int. Cl.[2] ........................................... H04M 1/21

[58] Field of Search .............. 179/1 J; 333/29, 30 R; 330/126; 84/1.24; 360/7

[56] References Cited

UNITED STATES PATENTS

| | | | |
|---|---|---|---|
| 2,107,804 | 2/1938 | Roux | 179/1 J |
| 2,843,676 | 7/1958 | Halliday | 179/1 J X |
| 3,154,644 | 10/1964 | Tak | 179/1 J |
| 3,769,611 | 10/1973 | Scaggs | 333/29 X |
| 3,881,057 | 4/1975 | Adachi | 179/1 J |

*Primary Examiner*—Kathleen H. Claffy
*Assistant Examiner*—E. S. Matt Kemeny
*Attorney, Agent, or Firm*—Lewis H. Eslinger; Alvin Sinderbrand

[57] ABSTRACT

A reverberation sound producing apparatus is disclosed which has an input terminal supplied with audio frequency signals, filters for dividing the audio frequency signals applied to the input terminal into a plurality of frequency bands, delay lines for delaying output signals from the filters by different intervals of time, and circuits for composing output signals from the delay lines and delivering delayed audio frequency signals to an output terminal. Lower frequencies are delayed longer, causing a concert hall effect.

8 Claims, 7 Drawing Figures

REVERBERATION SOUND PRODUCING APPARATUS

BACKGROUND OF THE INVENTION

1. Field of the Invention

The present invention relates generally to a reverberation sound producing apparatus and more particularly to a reverberation sound producing apparatus in which a reverberation sound substantially same as that obtained in the natural world is produced by an electric circuit.

2. Description of the Prior Art

In the art there is already proposed a reverberation sound producing apparatus or a reverberation sound generating apparatus in which an electric signal is applied through an electric-mechanical vibration converting element to one end of a mechanical vibration system such as a spring in the form of a mechanical vibration and then an electric signal is derived through a mechanical-electric vibration converting element from the other end of the spring. With the above mentioned prior art apparatus such a type of conversion is easily affected by an external mechanical vibration, and if the length of the spring is determined, the time period of a reverberation sound is fixed. Further, the frequency characteristics of the spring become constant in accordance with the diameter of the wire forming the spring, the diameter of the spring and a material making the wire of the spring, and consequently the frequency characteristics can not be changed from the outside thereof.

In addition to the above apparatus, there are proposed apparatus which employ a distribution factor, concentration factor and a magnetic delay line, but they can not be free from defects similar to the defects mentioned as above.

Recently, there is proposed an apparatus in which an electric charge transferring device is used to set a delay time period suitably and to produce a reverberation sound. However, the reverberation sound which is produced by an electric circuit is somewhat different from a natural one, because a natural reverberation sound such as, for example, that obtained at an audition room, a concert hall or a reverberation room has such characteristics that it has a long delay time interval for a low frequency component and a short delay time interval for a high frequency component, while the reverberation sound produced by the apparatus using the electric charge transferring device or element, mentioned above, has a constant delay time interval determined by an external control signal regardless of the frequency of an input signal.

SUMMARY OF THE INVENTION

It is an object of the present invention to provide a reverberation sound producing apparatus which produces a reverberation sound similar to that obtained naturally with a simple construction of an electric circuit.

It is another object of the invention to provide a reverberation sound producing apparatus in which audio frequency signals are distributed to a plurality of delay paths, filters with different frequency characteristics are inserted in the delay paths and signals passed through the delay paths with different delay time intervals are composed at an output terminal to produce a reverberation sound similar to that obtained in the natural world.

It is a further object of the invention to provide a reverberation sound producing apparatus in which a signal obtained from a delay path is applied to the input terminal of another delay path and an output signal obtained from each delay path is composed to produce electrically a reverberation sound which is formed of delayed signals with high density.

It is a further object of the invention to provide a reverberation sound producing apparatus in which delay time intervals are, of course, changed in response to the frequencies of input signals, the delay time interval is further changed for a signal component of the same frequency band, and the level is made low as the delay time interval becomes long to produce a reverberation sound further similar to that existing in the natural world.

It is a yet further object of the invention to provide a reverberation sound producing apparatus in which an electric charge transferring element is used as a delay element whose delay time interval is arbitrarily selected by changing the frequency of a clock pulse applied thereto, and a reverberation sound similar to that presented in the natural world is obtained even if the number of bits for the electric charge transferring elements is reduced.

It is a still further object of the invention to provide a reverberation sound producing apparatus in which audio frequency signals are applied to a plurality of lines or paths from an input terminal or an output terminal, filters with different band characteristics are inserted into the plurality of path or lines, and a short delay time interval is provided for a signal component with a high frequency, while a long delay time interval is provided for a signal component with a low frequency to produce a reverberation sound similar to that produced naturally with a circuit simple in construction and inexpensive.

The other objects, features and advantages of the present invention will be apparent from the following description taken in conjunction with the accompanying drawing.

DESCRIPTION OF THE PREFERRED EMBODIMENTS

According to the present invention, an input signal is divided into signal components with different frequency bands, the divided signal components with different frequency bands are delayed in time interval different with one another and then the delayed signal components are composed to produce a reverberation sound.

Figure 1:
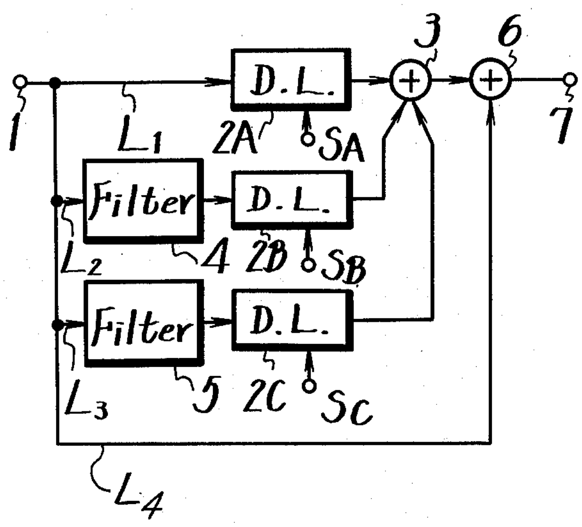
FIG. 1 is a block diagram showing a fundamental embodiment of the reverberation sound producing apparatus according to the present invention.
Figure 2:
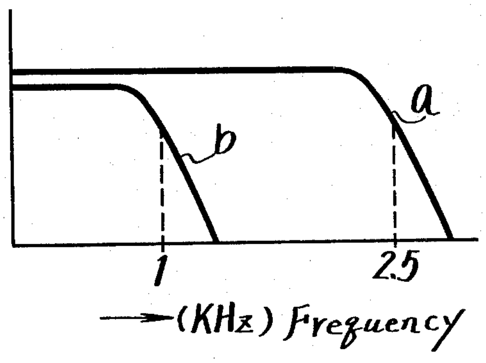
FIG. 2 is a graph showing the characteristics of a filter used in the embodiment of FIG. 1.

By way of example, as shown in FIG. 1, input signals such as audio frequency signals which are applied to an input terminal 1 are applied to a first delay unit 2A connected in series to a first path or line $L_1$ to delay the signals by, for example, 0.5 seconds. The delayed signal is then applied to an adder 3. The input audio frequency signals are applied also to a low pass filter 4 connected in series to a second delay path or line $L_2$ to pass therethrough a signal component with a frequency of up to 2.5 KHz as shown in FIG. 2 by a curve *a*. The frequency signal component from the low pass filter 4 is applied to a second delay unit 2B to be delayed by, for example, 2 seconds and then applied to the adder 3. The input audio frequency signals are further applied to a separate low pass filter 5 connected in series to a third path or line $L_3$ to deliver from the low pass filter 5 a frequency signal component with a frequency of up to 1KHz as shown by a curve *b* in FIG. 2. The output signal from the low pass filter 5 is applied to a third delay unit 2C to be delayed by, for example, 5 seconds and then applied to the adder 3. Further, the input audio frequency signals are directly applied through a fourth path or line $L_4$ to a separate adder 6. From the adder 3 there are obtained output reverberation sound signals which contain signal components delayed by 0.5 seconds, 2 seconds and 5 seconds, respectively, for the frequency lower than 1KHz, signal components delayed by 0.5 seconds and 2 seconds, respectively, for the frequency between 1 to 2.5 KHz and a signal component delayed by 0.5 seconds, only for the frequency higher than 2.5 KHz. The reverberation sound signal from the adder 3 is fed to the adder 6 in which it is composed with the input audio frequency signals. Thus, a sound signal added with the reverberation sound is delivered from the adder 6 to an output terminal 7.

In this case, as the delay units 2A to 2C, a well known electric charge transferring device such as a bucket brigade device or a charge coupled device is used. Such a device samples an input signal with a clock pulse and delivers the sampled signals sequentially. With this device, if it is assumed that its bit number is taken as *m* and the frequency of the clock pulse as a control signal as $f_c$, the delay time interval $\tau$ of the output signal relative to the input signal is expressed by the following equation (1).

$$\tau = m/f_c \qquad 1.$$

Accordingly, clock pulses with the same frequency are used, the delay time interval $\tau$ can be changed by changing the bit number *m*. On the other hand, if the same number of the bits is used, the delay time interval $\tau$ can be varied by changing the frequency $f_c$ of the clock pulses.

However, in order to avoid that the waveform fidelity of the delayed signal relative to the original input signal is deteriorated, the frequency $f_c$ of the clock pulse must be selected higher than the maximum frequency $f_m$ of the signal to be delayed by at least 2 times. Accordingly, if the maximum frequency of the input audio frequency signal is 10KHz, the frequency of the clock pulse to be applied to the first delay unit 2A must be higher than 20KHz. As a result, if the clock pulses of the same frequency are used and the delay time interval is varied by changing the bit number *m*, such a third delay unit 2C with the delay time interval $\tau$ of 5 seconds is required which has the bit number *m* of at lowest 100,000 and hence is very expensive.

For this reason, in the illustrated embodiment, the delay time intervals of the first to third delay units 2A to 2C are varied by changing the frequency of the clock pulses. For example, each bit number of the first to third delay units 2A to 2C is selected to be 10,000, a clock pulse $S_A$ with a frequency of 20KHz is applied to the first delay unit 2A to make its delay time interval as 0.5 seconds, a clock pulse $S_B$ with a frequency of 5 KHz is applied to the second delay unit 2B to make its delay time interval as 2 second, and a clock pulse $S_C$ with a frequency of 2KHz is applied to the third delay unit 2C to make its delay time interval as 5 seconds, respectively. If the delay time periods are varied by changing the frequencies of the clock pulses as described above, it is not necessary to use a delay unit or electric charge transferring device with a large number of bits and hence its cost becomes low. Further, since the delay time period can be selected arbitrarily by changing the frequency of the clock pulse, desired reverberation characteristics can be obtained.

Figure 3:
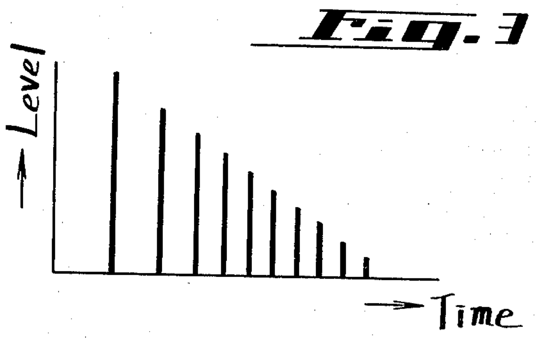
FIG. 3 is a graph showing the relationship between a delay time interval and the level of an output signal.

In the above case, if signal components with different delay time intervals are obtained for the signal components of the same frequency band and the levels of the signal components are made low as their delay time intervals become long as shown in FIG. 3, a more natural reverberation sound can be produced.

Figure 5:
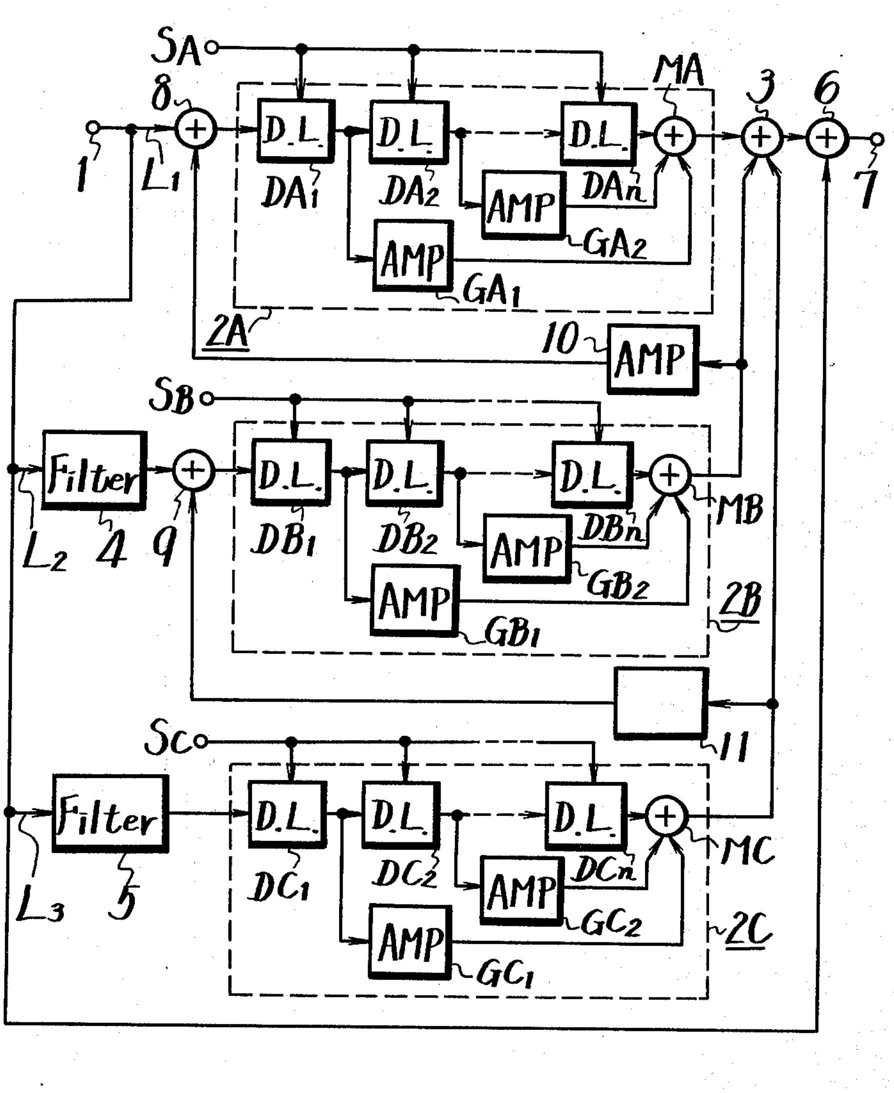
FIGS. 4 to 6, inclusive, are block diagrams showing other embodiments of the reverberation sound producing apparatus according to the invention, respectively.
Figure 4:
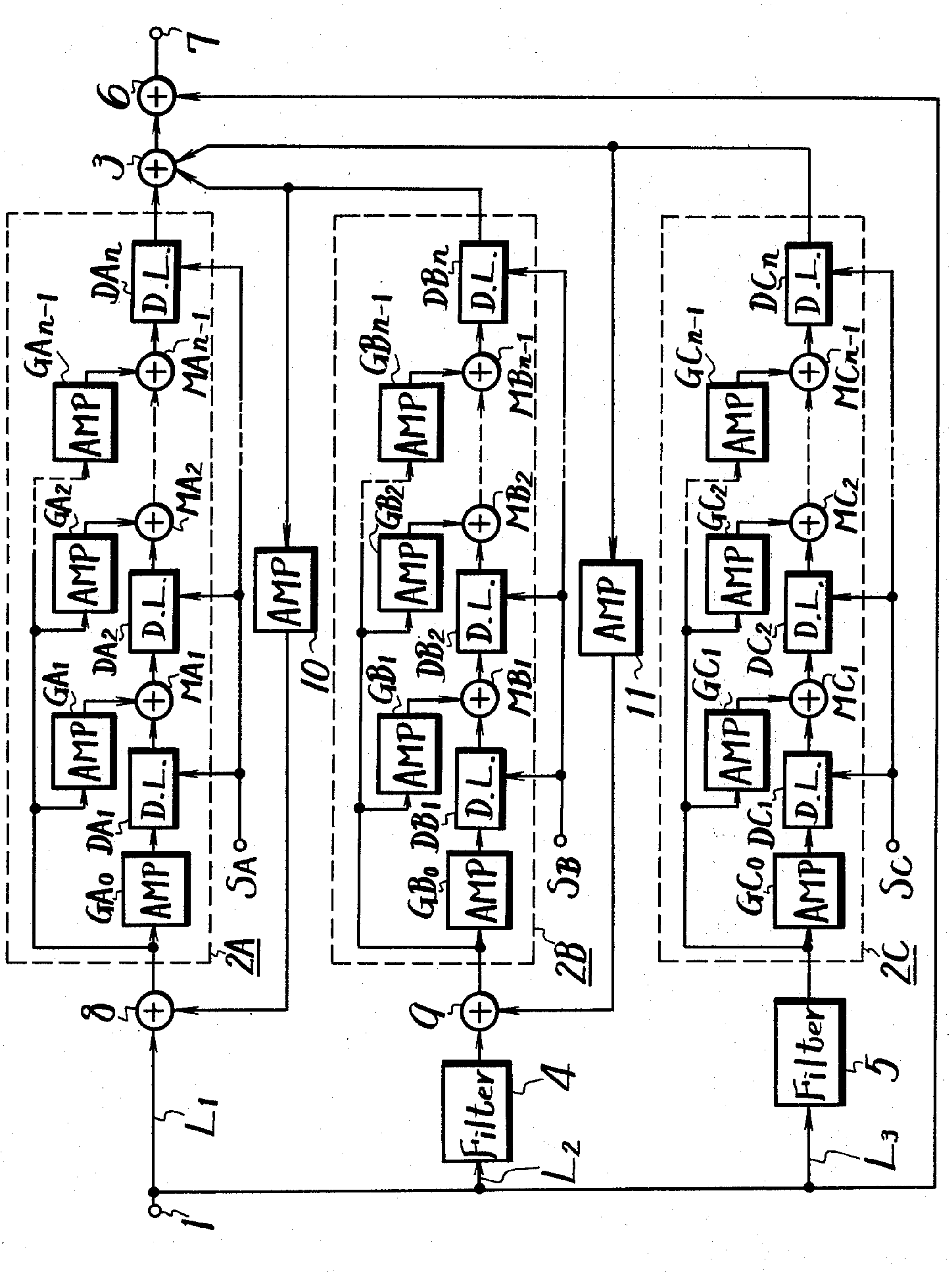
Figure 6:
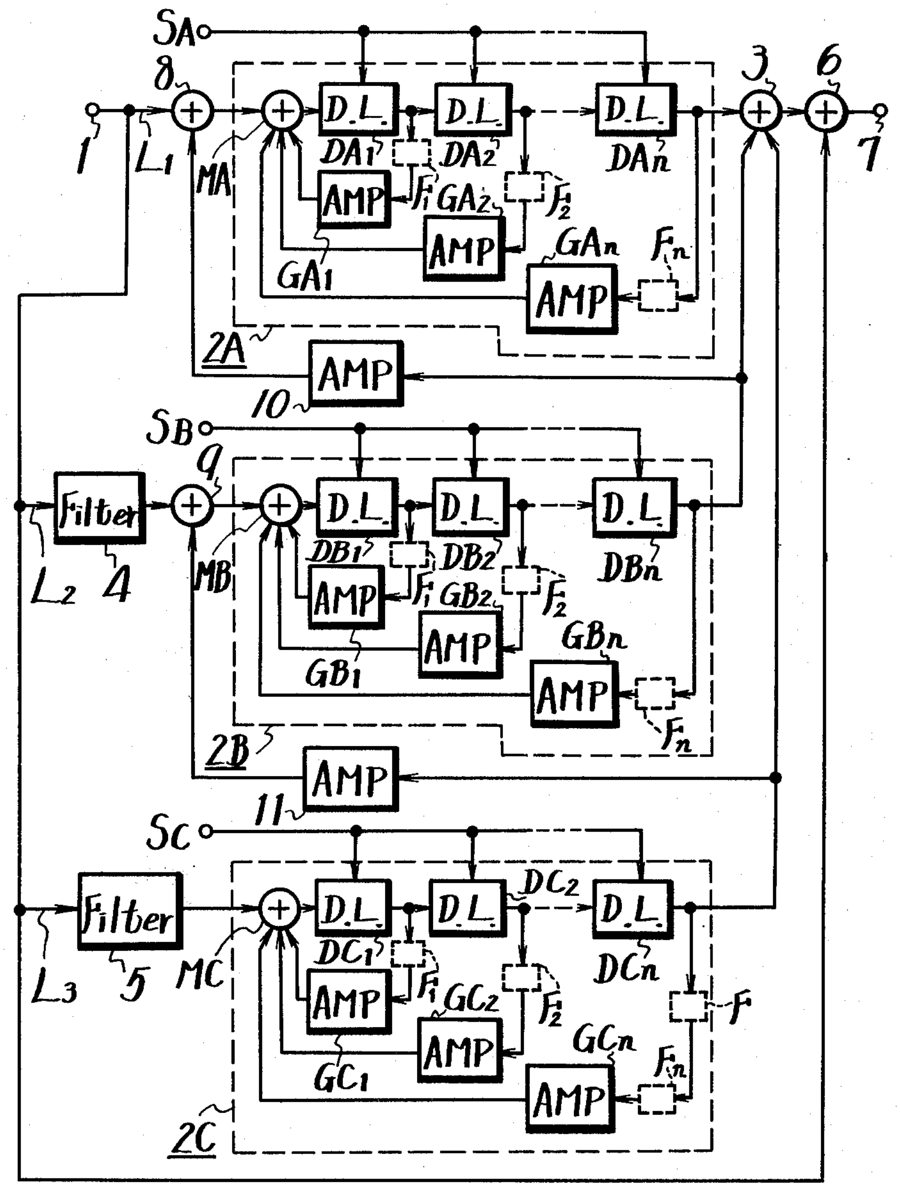

FIGS. 4 to 6 show practical embodiments of the present invention, respectively, in each of which the first to third delay units 2A to 2C are formed in consideration of the above fact, and in which similar reference numerals to those used in FIG. 1 indicate similar elements.

In the embodiment of FIG. 4, the first delay unit 2A connected into the line $L_1$ consists of *n*'s number of delay elements or lines $DA_1$ to $DA_n$ and (n-1)'s number of adders $MA_1$ to $MA_{n-1}$ connected between adjacent delay elements which are connected in series. In this case, an input audio frequency signal is applied through an amplifier $GA_0$ to the first delay line $DA_1$ and also through amplifiers $GA_1$ to $GA_{n-1}$ to the adders $MA_1$ to $MA_{n-1}$, and further the bit number of the delay lines become large to make the delay time interval long as the delay elements come to after-stages. In this case, the gain of the amplifiers connected to the post adders is increased. Thus, from the delay unit 2A there are obtained signal components with different delay time intervals for the same audio frequency signal and their levels are different as shown in FIG. 3. The other delay units 2B and 2C are formed similarly and hence the corresponding elements are marked with the corresponding references with symbols B and C in place of the that A.

With the embodiment of FIG. 4, since the delay time intervals of the respective delay lines of the delay units 2B and 2C inserted into the lines $L_2$ and $L_3$ become relatively long, time intervals of *n*'s number of signal components from the delay elements become relatively long, and consequently there is a fear that a reverberation feeling is deteriorated. In order to avoid such a fear, it is sufficient that, as shown in FIG. 4, adders 8 and 9 are connected between the input terminal 1 and the delay unit 2A and between the low pass filter 4 and the delay unit 2B, respectively, and output signals from the delay units 2B and 2C are applied through amplifiers 10 and 11 to the adders 8 and 9, respectively. Thus, signal components of a short time intervals are obtained together for a frequency component with a frequency lower than 1 KHz and that with a frequency lower than 2.5KHz and the reverberation feeling is not deteriorated.

In the embodiment of FIG. 5, the first delay unit 2A inserted into the signal line $L_1$ is formed of *n*'s number of delay elements or lines $DA_1$ to $DA_n$ connected in cascade, an adder MA connected to the final stage of the delay line $DA_n$ and amplifiers $GA_1$ to $GA_{n-1}$ which are supplied with output signals from the delay lines $DA_1$ to $DA_{n-1}$ and then supply their output signals to the adder MA. In this case, the bit numbers of the delay lines are selected large to make delay time intervals long as they come to the foregoing stage and the gains of the amplifiers supplied with the output signals from the foregoing stage of the delay lines are made large. The second and third delay units 2B and 2C inserted into the signal lines $L_2$ and $L_3$ are formed similarly, as shown in FIG. 5.

In the embodiment of FIG. 6, the first delay unit 2A inserted into the signal line $L_1$ is formed of an adder MA, *n*'s number of delay elements or lines $DA_1$ to $DA_n$ connected to the adder MA and in cascade with one another and *n*'s number of amplifiers $GA_1$ to $GA_n$ which are supplied with output signals from the delay lines $DA_1$ to $DA_n$ and then supply their output signals to the adder MA, respectively. In this case, the bit number or delay time interval of the respective delay lines may be selected equal, but the gains of the amplifiers supplied with output signals from the foregoing stage of the delay lines are made high. The second and third delay units 2B and 2C inserted into the signal lines $L_2$ and $L_3$ are formed similarly. In the embodiment of FIG. 6, it may be possible that filters $F_1$ to $F_n$ with different pass band characteristics are inserted between feedback lines from the delay lines $DA_1$ to $DA_n$ to the adder MA shown in FIG. 6 by dotted lines.

With the present invention described as above, a reverberation sound with characteristics, which have a long delay time interval for a signal component with a low frequency but a short delay time interval for a signal component with a high frequency as in the case of the natural reverberation sound, can be easily obtained. Especially, in the case where the delay time interval is selected by changing the frequency of the clock pulse applied to the electric charge transferring device, the bit number of the electric charge transferring device can be small and hence its construction becomes simple. Further, the delay time interval can be selected at will and hence desired reverberation characteristics can be effected.

It is also possible that an input audio frequency signal is sampled, the sampled value is converted into a digital signal, then delayed, and the delayed digital signal is converted to an analogue signal again.

Figure 7:
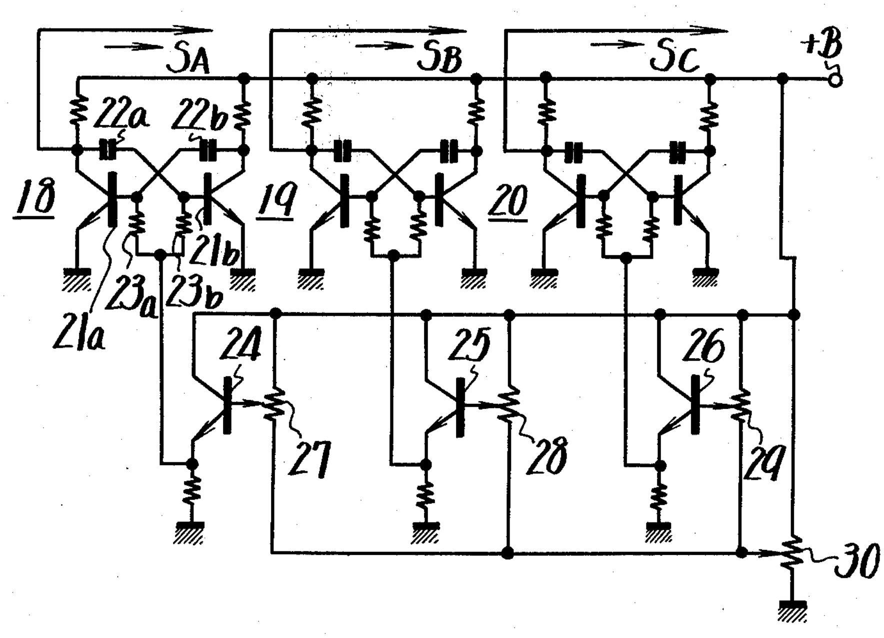
FIG. 7 is a circuit diagram showing a practical embodiment of a clock pulse generating circuit used in the invention.

FIG. 7 shows an embodiment of the clock pulse generator circuit which produces the clock pulses $S_A$, $S_B$ and $S_C$, respectively. The clock pulse generator of FIG. 7 consists of astable multivibrators 18, 19 and 20. Each of the astable multivibrators 18, 19 and 20 includes a pair of transistors 21*a* and 21*b*. The collector of the transistor 21*a* is connected through a capacitor 22*a* to the base of the transistor 21*b*, the collector of the transistor 21*b* is connected through a capacitor 22*b* to the base of the transistor 21*a*, the connection points between the collectors and bases of the different transistors are connected through resistors to a voltage source terminal +B, and the bases of the transistors 21*a* and 21*b* are supplied with base voltage through resistors 23*a* and 23*b*.

The base voltages for the astable multivibrators 18, 19 and 20 are supplied through transistors 24, 25 and 26 of an emitter-follower type, respectively, and the bases of the transistors 24 to 26 are supplied with a DC voltage through variable resistors 27, 28 and 29, respectively. These variable resistors 27 to 28 are connected in parallel with one another whose one common connection point is connected to the voltage source terminal +B and whose other common connection point is connected to the movable piece of a variable resistor 30 whose fixed part or resistor proper is connected between the voltage source terminal +B and the ground.

With the pulse generator shown in FIG. 7, the oscillation frequencies $f_1$, $f_2$ and $f_3$ of the astable multivibrators 18, 19 and 20 become high as the base voltages applied thereto through the transistors 24, 25 and 26 become great with the assumption that the respective circuit elements are selected equal in value. Accordingly, as the movable pieces of the variable resistors 27 to 29 are moved near the voltage source side of their fixed parts or resistors proper, the oscillation frequencies $f_1, f_2$ and $f_3$ become high. If the variable resistors 27 to 29 are adjusted independently, the condition $f_1>f_2>f_3$ or $S_A>S_B>S_C$ is established. Thus, if the output signals from the astable multivibrators 18 to 20 are applied to the first to third delay units as clock pulses, their delay time intervals $\tau_1$, $\tau_2$ and $\tau_3$ can be selected to satisfy the condition $\tau_1<\tau_2<\tau_3$. In this case, the variable resistor 30 acts to make high or low the oscillation frequencies of the astable multivibrators 18 to 20 together, and the movable piece of the variable resistor 30 is reached along its fixed part near the voltage source side, the oscillation frequency of each of the astable multivibrators 18 to 20 becomes high. Thus, by adjusting the variable resistor 30 the astable multivibrators 18 to 20 are limited in their frequency change.

It may be obvious that the present invention is not needed to be limited in scope to the illustrated examples, but many changes and variations could be effected by those skilled in the art without departing from the spirits and scope of the novel concepts of the invention. Therefore, the scope of the invention should be determined by the appended claims only.

I claim as my invention:

1. A reverberation sound producing apparatus comprising:

a. an input terminal and an output terminal;

b. a plurality of signal paths connected in parallel with one another between said input and output terminals;

c. a filter connected in series with one of said plurality of signal paths and dividing an input signal applied to said input terminal into signals with different frequency bands;

d. electrical charge transferring delay means connected in at least one of said plurality of signal paths for delaying signals applied thereto such that said signals applied to said signal paths are delayed for a longer duration when said signals are of a relatively low frequency than when said signals are of a relatively high frequency; and e. pulse signal means connected to said electrical charge transferring delay means to control the delay of signals passing through said delay means as a function of the repetition rate of pulses in said pulse signal.

2. A reverberation sound producing apparatus according to claim 1, in which said electrical charge transferring device comprises a plurality of delay elements connected in series and said apparatus further comprises:

a. a plurality of adders, each connected to a respective one of said delay elements; and b. amplifier means, each connecting said input terminal to a respective one of said adders for applying said signal from said input terminal to said adders.

3. A reverberation sound producing apparatus according to claim 2, in which each of said delay elements comprises a number of bit elements and said elements are connected in series between said input terminal and said output terminal, a delay element connected relatively closer to said output terminal having a greater bit number than a delay element connected closer to said input terminal, and the gain of an amplifier connected closer to said output terminal being higher than that of an amplifier connected closer to said input terminal.

4. A reverberation sound producing apparatus according to claim 1, in which:

a. said electrical charge transferring delay means comprises a plurality of delay elements, each of said delay elements comprising an output terminal;

b. an adder; and c. a plurality of amplifiers, each of said output terminals being connected through a respective one of said amplifiers to said adder.

5. A reverberation sound producing apparatus according to claim 4, in which the number of bit elements of said delay element connected closer to said output terminal is smaller than the number of bit elements of said delay element connected closer to said input terminal, and the gain of said amplifier connected to the output terminal of said delay element closer to said output terminal is lower than that of said amplifier connected to the output terminal of said delay element closer to said input terminal.

6. A reverberation sound producing apparatus according to claim 1, in which said electric charge transferring device comprises a plurality of delay elements connected in series, and each comprising an output terminal, and further includes feedback loops comprising amplifiers for connecting said output terminals of said delay elements to said input terminal.

7. A reverberation sound producing apparatus according to claim 6, further including filters connected in said feedback loops in series therewith and making frequency bands of signals passing through said loops different from one another.

8. A reverberation sound producing apparatus according to claim 1 further including means for applying an output signal from said delay means connected to a first one of said signal paths, said path being capable of passing therethrough a signal with a relatively low frequency band to an input terminal of a second one of said delay means connected to a second one of said signal paths, said second path being capable of passing therethrough a signal with a relatively higher frequency band.

* * * * *